United States Patent
Kasai et al.

(10) Patent No.: US 10,737,340 B2
(45) Date of Patent: Aug. 11, 2020

(54) DIELECTRIC WORKING FLUID PROCESSOR AND CONTROL METHOD OF DIELECTRIC WORKING FLUID PROCESSOR

(71) Applicant: FANUC CORPORATION, Yamanashi (JP)

(72) Inventors: Hirotsugu Kasai, Yamanashi-ken (JP); Hiroyuki Abe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/132,866

(22) Filed: Sep. 17, 2018

(65) Prior Publication Data
US 2019/0084064 A1 Mar. 21, 2019

(30) Foreign Application Priority Data
Sep. 20, 2017 (JP) .................. 2017-179751

(51) Int. Cl.
*B23H 1/10* (2006.01)
*B23H 7/36* (2006.01)
(Continued)

(52) U.S. Cl.
CPC .................. *B23H 1/10* (2013.01); *B23H 7/36* (2013.01); *B23H 1/02* (2013.01); *B23H 7/14* (2013.01)

(58) Field of Classification Search
CPC ... B23H 1/02; B23H 1/10; B23H 7/14; B23H 7/36
(Continued)

(56) References Cited

U.S. PATENT DOCUMENTS

2005/0023195 A1 2/2005 Kita et al.
2005/0284507 A1 12/2005 Boesche
(Continued)

FOREIGN PATENT DOCUMENTS

CN 102078991 A 6/2011
CN 102756189 A 10/2012
(Continued)

OTHER PUBLICATIONS

Japanese to English machine translation of JP H04176517, Published in 1992.*
(Continued)

*Primary Examiner* — Michael G Hoang
(74) *Attorney, Agent, or Firm* — Fredrikson & Byron P.A.

(57) ABSTRACT

A dielectric working fluid processor for processing dielectric working fluid used in a wire electrical discharge machine includes: a dirty liquid tank for storing dielectric working fluid containing machining swarf; a filter for removing machining swarf from the dielectric working fluid in the dirty liquid tank; a clean liquid tank for storing the dielectric working fluid from which the machining swarf has been removed by the filter; a pump for supplying dielectric working fluid from the dirty liquid tank to the filter; an inverter for controlling electric power to be supplied to the pump; a pump controller for controlling the rotation speed of the pump by varying the frequency of electric power supplied from the inverter to the pump; and a feed pressure obtainer for obtaining the feed pressure of the dielectric working fluid supplied from the pump to the filter, based on the frequency of the electric power.

15 Claims, 3 Drawing Sheets

(51) Int. Cl.
  *B23H 1/02* (2006.01)
  *B23H 7/14* (2006.01)
(58) Field of Classification Search
  USPC .............................. 219/69.11, 69.13, 69.14
  See application file for complete search history.

(56) References Cited

U.S. PATENT DOCUMENTS

| | | | | |
|---|---|---|---|---|
| 2014/0124418 | A1* | 5/2014 | Ishihara | B23Q 11/1069 210/86 |
| 2016/0096231 | A1 | 4/2016 | Nishikawa et al. | |
| 2017/0328469 | A1 | 11/2017 | Le Dren et al. | |
| 2018/0266935 | A1* | 9/2018 | Jaques | B23H 7/02 |

FOREIGN PATENT DOCUMENTS

| | | | |
|---|---|---|---|
| CN | 103801977 | A | 5/2014 |
| CN | 104858515 | A | 8/2015 |
| CN | 104972187 | A | 10/2015 |
| FR | 3029587 | A1 | 6/2016 |
| JP | S61293729 | A | 12/1986 |
| JP | 4176517 | A | 6/1992 |
| JP | 4261713 | A | 9/1992 |
| JP | 5228735 | A | 9/1993 |
| JP | 1148040 | A | 2/1999 |
| JP | 2002283146 | A | 10/2002 |
| JP | 2005894 | A | 1/2005 |
| JP | 200546984 | A | 2/2005 |
| JP | 20153352 | A | 1/2015 |
| JP | 201537762 | A | 2/2015 |
| JP | 201674057 | A | 5/2016 |

OTHER PUBLICATIONS

English Abstract and Machine Translation for Japanese Publication No. 2005-000894 A, published Jan. 6, 2005, 7 pgs.

English Abstract for French Publication No. 3029587 A1, published Jun. 10, 2016, 2 pgs.
Extended European Search Report for European Patent Application No. 18194199.8, dated Jan. 29, 2019, 9 pgs.
English Machine Translation of Japanese Publication No. 2015-037762 A, published Feb. 26, 2015, 14 pgs.
English Machine Translation of Japanese Publication No. 2002-283146 A, published Oct. 3, 2002, 9 pgs.
English Machine Translation of Japanese Publication No. 2015-003352 A, published Jan. 8, 2015, 10 pgs.
English Abstract and Machine Translation for Japanese Publication No. JP04-176517 A, published Jun. 24, 1992, 6 pgs.
English Abstract for Japanese Publication No. 2016-074057 A, published May 12, 2016, 2 pgs.
English Abstract and Machine Translation for Japanese Publication No. 05-228735 A, published Sep. 7, 1993, 10 pgs.
English Abstract for Japanese Publication No. 2005-046984 A, published Feb. 24, 2005, 2 pgs.
English Abstract and Machine Translation for Japanese Publication No. 11-048040 A, published Feb. 23, 1999, 9 pgs.
English Abstract and Machine Translation for Japanese Publication No. H04-261713 A, published Sep. 17, 1992, 8 pgs.
English Abstract and Machine Translation for Japanese Publication No. JPS61-293729A, published Dec. 24, 1986, 3 pages.
English Abstract and Machine Translation for Chinese Publication No. CN102078991A, published Jun. 1, 2011, 11 pages.
English Abstract and Machine Translation for Chinese Publication No. CN102756189A, published Oct. 31, 2012, 10 pages.
English Abstract and Machine Translation for Chinese Publication No. CN103801977A, published May 21, 2014, 28 pages.
English Abstract and Machine Translation for Chinese Publication No. CN104858515A, published Aug. 26, 2015, 10 pages.
English Abstract and Machine Translation for Chinese Publication No. CN104972187A, published Oct. 14, 2015, 14 pages.

* cited by examiner

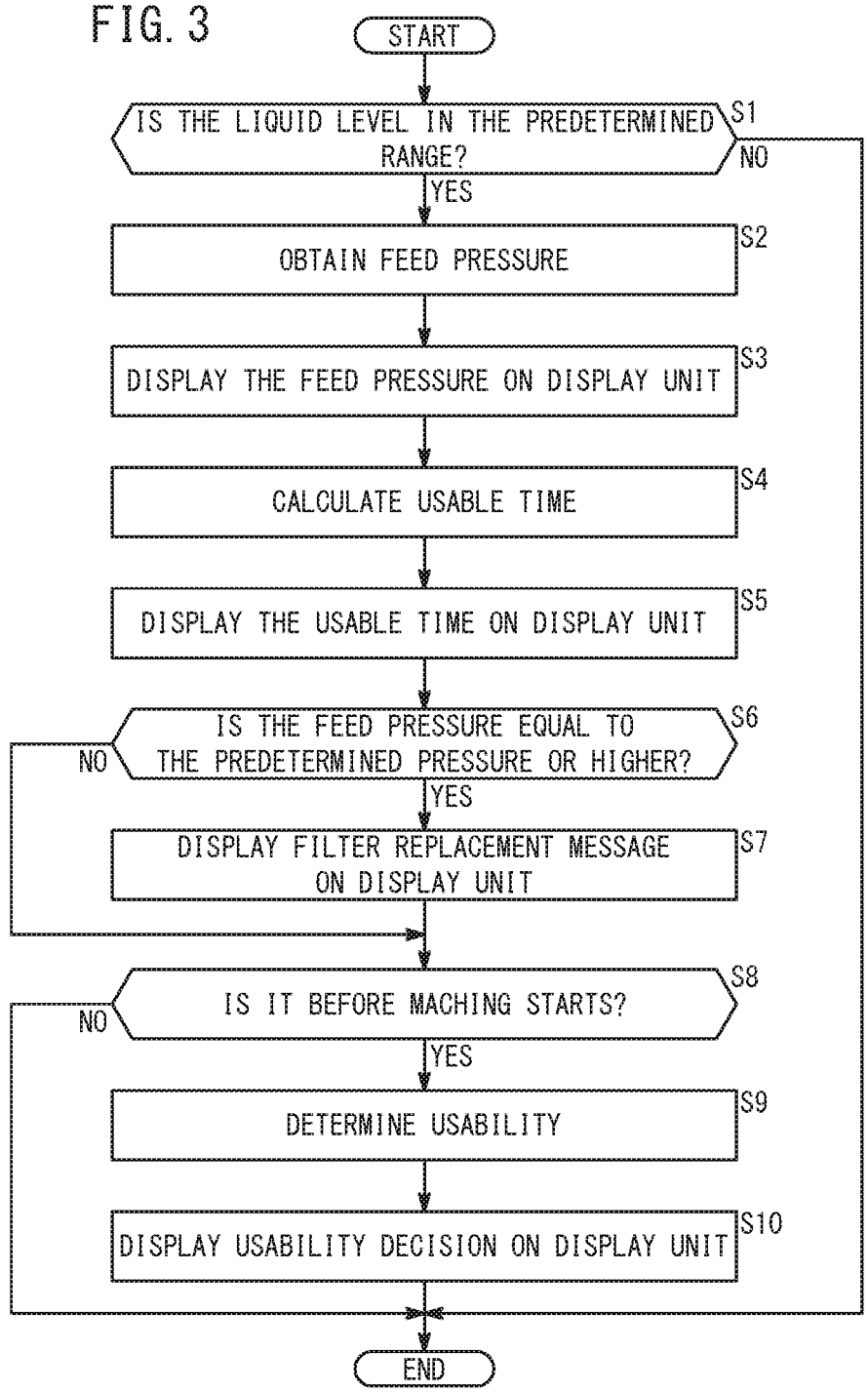

DIELECTRIC WORKING FLUID PROCESSOR AND CONTROL METHOD OF DIELECTRIC WORKING FLUID PROCESSOR

CROSS-REFERENCE TO RELATED APPLICATION

This application is based upon and claims the benefit of priority from Japanese Patent Application No. 2017-179751 filed on Sep. 20, 2017, the contents of which are incorporated herein by reference.

BACKGROUND OF THE INVENTION

Field of the Invention

The present invention relates to a dielectric working fluid processor for processing a dielectric working fluid in a wire electrical discharge machine and a control method of the dielectric working fluid processor.

Description of the Related Art

Japanese Laid-Open Patent Publication No. 04-176517 discloses a dielectric working fluid filtration device. With a filter circuiting pump, the dielectric working fluid filtration device conveys wastewater containing machining swarf from a wastewater tank through a paper filter and feeds the filtered water to a clean water tank.

SUMMARY OF THE INVENTION

The technology described in Japanese Laid-Open Patent Publication No. 04-176517 needs to replace the paper filter that has been clogged up with machining swarf. This configuration makes it possible to determine the timing for replacing the filter by detecting the pressure of the dielectric working fluid with a pressure sensor arranged between the pump and the filter, but entails a problem that the pressure sensor is required only to decide the replacement timing of the filter, leading to an increase in cost.

The present invention has been devised to solve the above problem, it is therefore an object of the present invention to provide a dielectric working fluid processor and a control method for the dielectric working fluid processor capable of determining, without a pressure sensor, the pressure of the dielectric working fluid fed to a filter from a pumpdielectric working fluid.

A first aspect of the present invention resides in a dielectric working fluid processor for processing dielectric working fluid used in a wire electrical discharge machine, comprising: a dirty liquid tank configured to store dielectric working fluid containing machining swarf; a filter configured to remove the machining swarf from the dielectric working fluid in the dirty liquid tank; a clean liquid tank configured to store the dielectric working fluid from which the machining swarf has been removed by the filter; a pump configured to supply the dielectric working fluid from the dirty liquid tank to the filter; an inverter configured to control electric power to be supplied to the pump; a liquid level obtainer configured to obtain a liquid level of the dielectric working fluid in the clean liquid tank; a pump controller configured to control a rotation speed of the pump by varying frequency of electric power supplied from the inverter to the pump so as to adjust the liquid level of the dielectric working fluid in the clean liquid tank to a predetermined liquid level; and a feed pressure obtainer configured to obtain the feed pressure of the dielectric working fluid supplied from the pump to the filter, based on the frequency of the electric power.

A second aspect of the present invention resides in a control method of a dielectric working fluid processor for processing dielectric working fluid used in a wire electrical discharge machine which includes: a dirty liquid tank configured to store dielectric working fluid containing machining swarf; a filter configured to remove the machining swarf from the dielectric working fluid in the dirty liquid tank; a clean liquid tank configured to store the dielectric working fluid from which the machining swarf has been removed by the filter; a pump configured to supply the dielectric working fluid from the dirty liquid tank to the filter; an inverter configured to control electric power to be supplied to the pump; a liquid level obtainer configured to obtain the liquid level of the dielectric working fluid in the clean liquid tank; and a pump controller configured to control a rotation speed of the pump by varying the frequency of electric power supplied from the inverter to the pump so as to adjust the liquid level of the dielectric working fluid in the clean liquid tank to a predetermined liquid level. The control method comprises a step of obtaining the feed pressure of the dielectric working fluid supplied from the pump to the filter, based on the frequency of the electric power.

According to the present invention, it is possible to obtain the feed pressure of the dielectric working fluid supplied from the pump to the filter without using a pressure sensor.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart showing the flow of a process performed in the control unit.

DESCRIPTION OF THE PREFERRED EMBODIMENTS

First Embodiment

[Configuration of Dielectric Working Fluid Processor]

Figure 1:
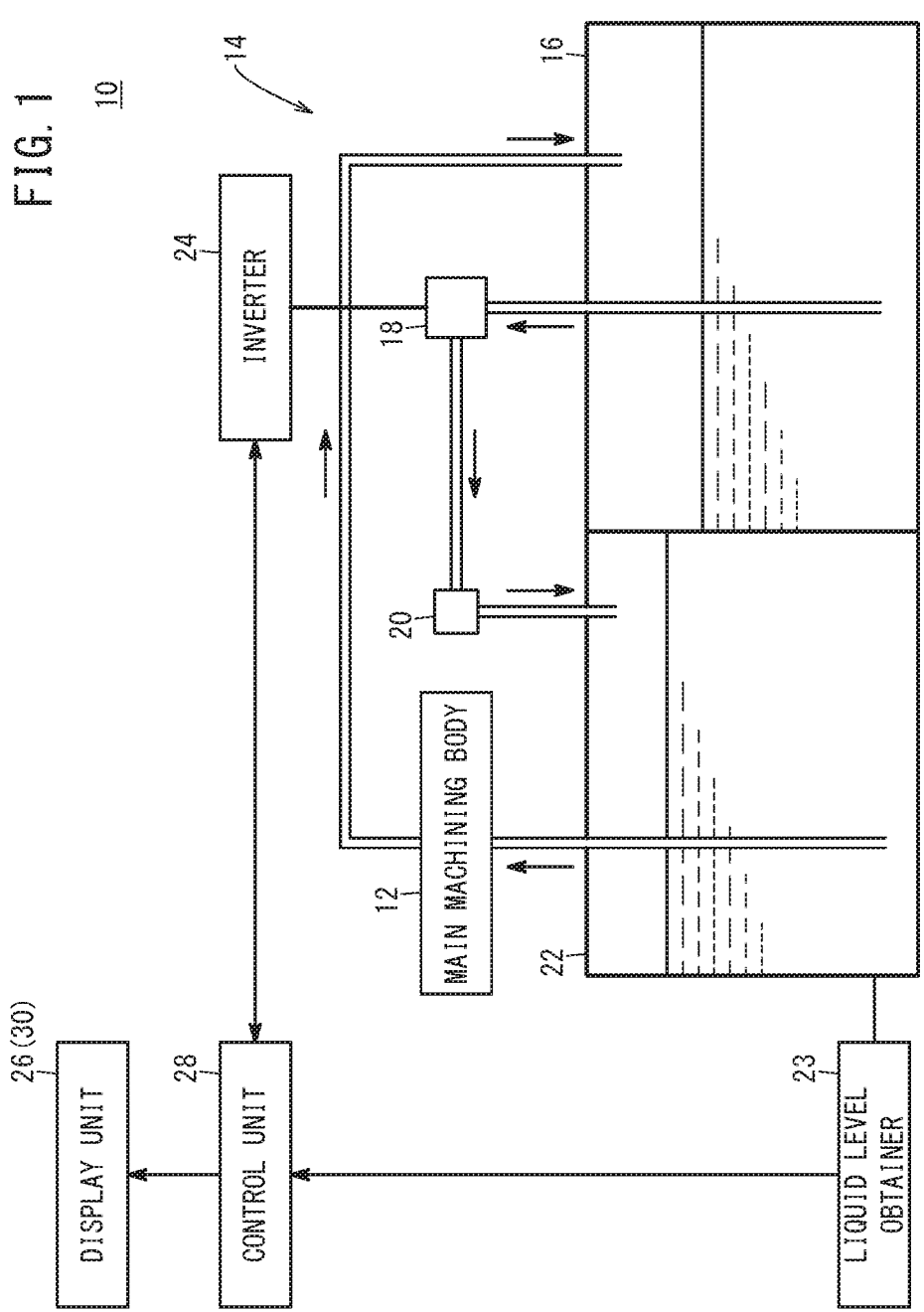
FIG. 1 is a schematic diagram of a wire electrical discharge machine.

FIG. 1 is a schematic diagram of a wire electrical discharge machine 10. The wire electrical discharge machine 10 has a main machining body 12 and a dielectric working fluid processor 14. The dielectric working fluid processor 14 is a device for removing machining swarf from a dielectric working fluid contaminated by machining swarf generated during machining by the main machining body 12. The dielectric working fluid processor 14 includes a dirty liquid tank 16, a pump 18, a filter 20, a clean liquid tank 22, an inverter 24, a liquid level obtainer 23, a display unit 26, and a control unit 28.

The dirty liquid tank 16 receives the dielectric working fluid containing machining swarf from main machining body 12 and stores the dielectric working fluid therein. The pump 18 draws the dielectric working fluid containing machining swarf stored in the dirty liquid tank 16 and supplies the dielectric working fluid to the filter 20. The filter 20 removes machining swarf from the supplied dielectric working fluid that contains machining swarf. The clean liquid tank 22 stores the dielectric working fluid from which machining swarf has been removed through the filter 20. The liquid level obtainer 23 is a sensor that detects the liquid level of the dielectric working fluid in the clean liquid tank 22. Features of the liquid level obtainer 23 are not particularly limited as long as the liquid level obtainer 23 can obtain the liquid level of the dielectric working fluid in the clean liquid tank 22.

An inverter 24 supplies electric power to the pump 18 by driving unillustrated switching elements under control of the control unit 28. The inverter 24 controls the rotation speed of the pump 18 by changing the frequency of the electric power supplied to the pump 18 and regulates a supply amount of dielectric working fluid that is supplied from the pump 18 to the filter 20. The display unit 26 is an LCD monitor or the like driven under control of the control unit 28 and displays images, text, and the like to give notice to the operator. It should be noted that the display unit 26 constitutes a notifier 30.

Figure 2:
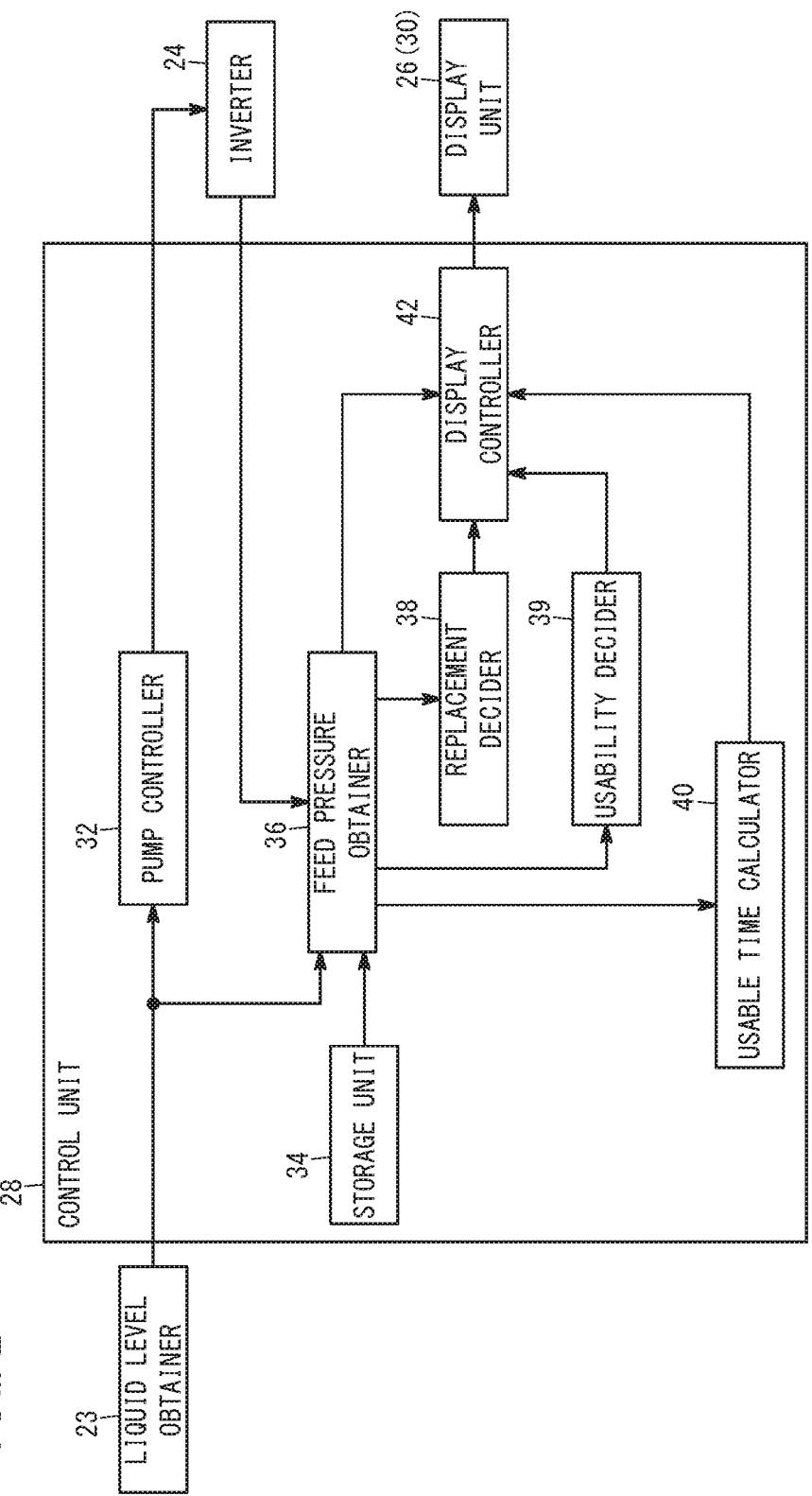
FIG. 2 is a block diagram of a control unit.

FIG. 2 is a block diagram of the control unit 28. The control unit 28 includes a pump controller 32, a storage unit 34, a feed pressure obtainer 36, a replacement decider 38, a usability decider 39, a usable time calculator 40, and a display controller 42.

The pump controller 32 receives input of information on the liquid level of the dielectric working fluid in the clean liquid tank 22 from the liquid level obtainer 23. The pump controller 32 performs the proportional integral control of the pump 18, based on the difference between the level of dielectric working fluid in the clean liquid tank 22 input from the liquid level obtainer 23 and a predetermined liquid level. The pump controller 32 calculates the frequency of electric power to be supplied from the inverter 24 to the pump 18 according to the amount of control based on the proportional integral control of the pump 18 and outputs to the inverter 24 a drive signal based on the calculated frequency.

The storage unit 34 stores a map showing the relationship between the frequency of electric power to be supplied from the inverter 24 to the pump 18 and the pressure of the dielectric working fluid fed from the pump 18 to the filter 20 (hereinafter referred to as feed pressure). This map is obtained in advance by experiment or the like and shows the relationship between the frequency of electric power to be supplied from the inverter 24 to the pump 18 and the feed pressure of the dielectric working fluid when the dielectric working fluid in the clean liquid tank 22 is within a predetermined range including the predetermined liquid level.

Clogging occurs in the filter 20 due to machining swarf as the filter 20 is used longer. Therefore, in order to keep constant the supply amount of the dielectric working fluid from the filter 20 to the clean liquid tank 22, it is necessary to increase the feed pressure of the dielectric working fluid as the degree of clogging in the filter 20 becomes higher. The above map shows the relationship between the frequency of the electric power that increases mainly depending on the integral control component of the pump 18 and the feed pressure of the dielectric working fluid that increases due to clogging of the filter 20 when the liquid level in the clean liquid tank 22 is around the predetermined liquid level.

The feed pressure obtainer 36 acquires the feed pressure of the dielectric working fluid according to the frequency of electric power supplied from the inverter 24 to the pump 18, from the map stored in the storage unit 34. The feed pressure obtainer 36 acquires the feed pressure of the dielectric working fluid when the liquid level in the clean liquid tank 22 is within the predetermined range including the predetermined liquid level. Here, the feed pressure obtainer 36 may calculate the feed pressure of dielectric working fluid by using a preset calculation formula without using the map.

The replacement decider 38 determines whether or not it is necessary to replace the filter 20. When the feed pressure of the dielectric working fluid acquired by the feed pressure obtainer 36 is equal to or higher than the predetermined pressure, the replacement decider 38 determines that replacement of the filter 20 is necessary, and when it is less than the predetermined pressure, the replacement decider 38 determines that replacement of the filter 20 is unnecessary.

Before the main machining body 12 starts machining a workpiece, the usability decider 39 determines whether or not the filter 20 can be used during machining of the workpiece to be started from now, based on the feed pressure of the dielectric working fluid acquired by the feed pressure obtainer 36. The availability of the filter 20 for the workpiece machining to be started from now means that the currently attached filter 20 will be able to work without replacement, from the start to the end of the machining of the workpiece by the main machining body 12.

The usability decider 39 estimates the amount of the machining swarf expected to arise in the machining of the workpiece to be started from now, based on the machining conditions of the main machining body 12, materials of the workpiece, the thickness of the workpiece, the diameter of the unillustrated wire electrode, materials of the wire electrode, and materials of the dielectric working fluid. The usability decider 39 estimates, based on the estimation of the amount of machining swarf generated, the feed pressure of the dielectric working fluid at the time when the machining of the workpiece to be started from now is completed. When the estimated feed pressure of dielectric working fluid after the end of machining of the workpiece is less than the above-mentioned predetermined pressure, the usability decider 39 determines that the filter 20 can be used for the machining of the workpiece to be started from now. On the other hand, when the estimated feed pressure of dielectric working fluid after the end of machining of the workpiece is equal to or higher than the above-described predetermined pressure, the usability decider 39 determines that the filter 20 cannot be used for the machining of the workpiece to be started from now.

The usable time calculator 40 calculates a usable time of the filter 20, based on the feed pressure of dielectric working fluid acquired by the feed pressure obtainer 36. Based on the machining conditions at the main machining body 12, materials of the workpiece, the thickness of the workpiece, the diameter of the wire electrode, materials of the wire electrode, and materials of the dielectric working fluid, the usable time calculator 40 estimates the amount of machining swarf generated in unit time. Only the amount of swarf generated per unit time during the current machining may be estimated, and if the schedule of the subsequent machining is known, the amount of swarf generated per unit time during each machining may be estimated.

The usable time calculator 40 estimates the amount of increase in the feed pressure of the dielectric working fluid per unit time due to clogging of swarf in the filter 20, from the estimated amount of swarf generated per unit time. The usable time calculator 40 calculates the usable time by dividing the difference between the current feed pressure of dielectric working fluid and the aforementioned predetermined pressure by the estimated amount of increase in the feed pressure of dielectric working fluid per unit time.

The display controller 42 controls the display unit 26 to display the feed pressure of dielectric working fluid obtained by the feed pressure obtainer 36. Further, when the replacement decider 38 determines that replacement of the filter 20 is needed, the display controller 42 controls the display unit 26 to display information that the filter 20 need be replaced. Further, the display controller 42 controls the display unit 26 so as to display the decision (either the filter 20 is usable or unusable) determined by the usability decider 39 before the machining is started. Further, the display controller 42 controls the display unit 26 so as to display the usable time of the filter 20 calculated by the usable time calculator 40.

Instead of using the display unit 26, an unillustrated speaker or the like may be used to notify the operator by voice or the like, of the above-described feed pressure of dielectric working fluid, the necessity of the replacement of the filter 20, the decision on whether or not the filter 20 is usable, and the usable time of the filter 20.

FIG. 3 is a flowchart showing the flow of processing performed in the control unit 28. The process shown in FIG. 3 is repeated at a predetermined cycle during the machining by the main machining body 12.

At step S1, the feed pressure obtainer 36 determines whether or not the liquid level in the clean liquid tank 22 is within a predetermined range including the aforementioned predetermined liquid level. When the liquid level in the clean liquid tank 22 is within the predetermined range, the control proceeds to step S2, and when the liquid level in the clean liquid tank 22 is out of the predetermined range, the control is terminated.

At step S2, the feed pressure obtainer 36 acquires the feed pressure of dielectric working fluid, and the control proceeds to step S3. At step S3, the display controller 42 controls the display unit 26 so as to display the feed pressure of dielectric working fluid obtained by the feed pressure obtainer 36, and the control proceeds to step S4.

At step S4, the usable time calculator 40 calculates the usable time of the filter 20, and the control proceeds to step S5. At step S5, the display controller 42 controls the display unit 26 so as to display the usable time of the filter 20 calculated by the usable time calculator 40, and the control proceeds to step S6.

At step S6, the replacement decider 38 determines whether or not the feed pressure of dielectric working fluid acquired by the feed pressure obtainer 36 is equal to or higher than the predetermined pressure. When the feed pressure of the dielectric working fluid acquired by the feed pressure obtainer 36 is equal to or higher than the predetermined pressure, the control goes to step S7. When the feed pressure of dielectric working fluid acquired by the feed pressure obtainer 36 is less than the predetermined pressure, the control goes to step S8. At step S7, the display controller 42 controls the display unit 26 so as to display the necessity of the replacement of the filter 20, and the control proceeds to step S8.

At step S8, the usability decider 39 determines whether it is before the machining of a workpiece by the main machining body 12 starts. When it is before the machining of the workpiece starts, the control proceeds to step S9, and when the workpiece machining has already started, the control is terminated.

At step S9, the usability decider 39 determines whether or not the filter 20 is usable in the machining to be started from now, and the control proceeds to step S10. At step S10, the display controller 42 displays results of the decision as to whether or not the filter 20 is usable in the machining to be started from now, and then the control is ended.

[Operation and Effect]

Clogging occurs in the filter 20 due to machining swarf as the filter 20 is used longer. Even if the amount of supply of dielectric working fluid from the pump 18 to the filter 20 is constant, the amount of dielectric working fluid fed from the filter 20 to the clean liquid tank 22 decreases as the degree of clogging at the filter 20 increases. Since the pump 18 is controlled under the proportional integral scheme, when the amount of dielectric working fluid supplied from the filter 20 to the clean liquid tank 22 decreases, the integral component of the difference between the liquid level of the dielectric working fluid in the clean liquid tank 22 and the predetermined liquid level increases whereby the pump 18 is controlled so as to increase the supply amount of dielectric working fluid to the filter 20, hence the feed pressure of the dielectric working fluid rises.

Conventionally, in order to determine the degree of clogging of the filter 20, a pressure sensor has been used to detect the feed pressure of dielectric working fluid. However, since the pressure sensor has to be provided only for grasping the degree of clogging of the filter 20, giving rise to a problem that the cost of manufacturing the dielectric working fluid processor 14 increases.

To deal with this problem, in the present embodiment, the feed pressure obtainer 36 is adapted to acquire the feed pressure of dielectric working fluid, based on the frequency of the electric power supplied from the inverter 24 to the pump 18. As a result, it is possible to obtain the feed pressure of dielectric working fluid without a pressure sensor, and the cost of manufacturing the dielectric working fluid processor 14 can be lowered.

Further, in the present embodiment, the storage unit 34 is provided for storing the map representing the relationship between the frequency of electric power supplied from the inverter 24 to the pump 18 and the feed pressure of dielectric working fluid when the liquid level of the dielectric working fluid in the clean liquid tank 22 is within the predetermined range including the predetermined liquid level. The feed pressure of the working liquid is acquired based on the map when the liquid level of the dielectric working fluid in the clean liquid tank 22 falls within the predetermined range.

The feed pressure of dielectric working fluid increases because of the following two causes. The first cause is that the amount of dielectric working fluid supplied from the filter 20 to the clean liquid tank 22 has been increased in response to a fall in the liquid level in the clean liquid tank 22. The second cause is that the amount of dielectric working fluid supplied from the pump 18 to the filter 20 has been increased in order to restore the amount of dielectric working fluid supplied from the filter 20 to the clean liquid tank 22 that has been reduced due to clogging of the filter 20. In the present embodiment, in order to determine the increase in the feed pressure of dielectric working fluid attributed to the second cause, the feed pressure is acquired based on the map when the level of dielectric working fluid in the clean liquid tank 22 is within the predetermined range. In this way, it is possible to obtain the feed pressure of dielectric working fluid corresponding to the degree of clogging of the filter 20.

Further, in the present embodiment, the feed pressure of dielectric working fluid is displayed by the display unit 26. This enables the operator to know the feed pressure of dielectric working fluid. Thus, the operator can recognize the necessity of replacing the filter 20 from the feed pressure of dielectric working fluid.

Further, the present embodiment is configured so that the replacement decider 38 determines that the filter 20 needs to be replaced when the feed pressure of dielectric working fluid becomes equal to or higher than the predetermined pressure. Thereby, it is possible to determine the necessity of the replacement of the filter 20 without relying on operator's knowledge and experience.

In addition, in the present embodiment, the display unit 26 is configured to give notice of the necessity of the replacement of the filter 20 when it is determined so. Thus, it is possible to inform the operator that the filter 20 need be replaced. The operator can recognize the necessity of replacing the filter 20.

Further, in the present embodiment, the usability decider 39 is configured to determine whether the filter 20 is usable or not in the machining to be started from now based on the obtained feed pressure. Thus, it is possible to determine whether or not the filter 20 can be used in the machining to be started from now, without relying on operator's knowledge and experience.

Further, in the present embodiment, the display unit 26 is configured to display information on whether or not the filter 20 is usable in the machining to be started from now. As a result, when the filter 20 is unusable in the machining to be started from now, the operator can take a proper measure such as replacement of the filter 20 in advance or preparation in advance of a filter 20 for replacement.

Moreover, in the present embodiment, the usable time calculator 40 is configured to calculate the usable time of the filter 20, based on the feed pressure of dielectric working fluid. Thereby, the usable time of the filter 20 can be determined without relying of operator's knowledge and experience.

Furthermore, in the present embodiment, the display unit 26 is configured to display the usable time of the filter 20. Thereby, the usable time of the filter 20 can be notified to the operator. The operator can take measures such as preparing a replacement filter 20 in advance, taking into account the usable time of the current filter 20.

[Technical Ideas Obtained from Embodiment]

Technical ideas that can be grasped from the above embodiment will be described below.

A dielectric working fluid processor (14) for processing dielectric working fluid used in a wire electrical discharge machine (10) includes: a dirty liquid tank (16) configured to store dielectric working fluid containing machining swarf; a filter (20) configured to remove the machining swarf from the dielectric working fluid in the dirty liquid tank (16); a clean liquid tank (22) configured to store the dielectric working fluid from which the machining swarf has been removed by the filter (20); a pump (18) configured to supply the dielectric working fluid from the dirty liquid tank (16) to the filter (20); an inverter (24) configured to control electric power to be supplied to the pump (18); a liquid level obtainer (23) configured to obtain the liquid level of the dielectric working fluid in the clean liquid tank (22); a pump controller (32) configured to control the rotation speed of the pump (18) by varying the frequency of electric power supplied from the inverter (24) to the pump (18) so as to adjust the liquid level of the dielectric working fluid in the clean liquid tank (22) to a predetermined liquid level; and a feed pressure obtainer (36) configured to obtain the feed pressure of the dielectric working fluid supplied from the pump (18) to the filter (20), based on the frequency of the electric power. Thereby, it is possible to suppress the cost of manufacturing the dielectric working fluid processor (14).

The above dielectric working fluid processor (14) may further include a storage unit (34) configured to store a predetermined map showing a relationship between the frequency of the electric power and the feed pressure, the relationship given when the liquid level of the dielectric working fluid in the clean liquid tank (22) is within a predetermined range including the predetermined liquid level. In this configuration, the feed pressure obtainer (36) may obtain the feed pressure, based on the map and when the liquid level is within the predetermined range. As a result, it is possible to obtain the feed pressure of the dielectric working fluid, corresponding to the degree of clogging of the filter (20).

The above dielectric working fluid processor (14) may further include a notifier (30) configured to notify the operator of the obtained feed pressure. Thereby, it is possible to notify the operator of the feed pressure of the dielectric working fluid supplied from the pump (18) to the filter (20).

The above dielectric working fluid processor (14) may further include a replacement decider (38) configured to determine that the filter (20) need be replaced when the obtained feed pressure is equal to or higher than a predetermined pressure. Thereby, it is possible to determine the necessity of the replacement of the filter (20), without relying on operator's knowledge and experience.

The above dielectric working fluid processor (14) may further include a notifier (30) configured to notify the operator that the filter (20) need be replaced when it is determined so. In this way, it is possible to inform the operator that the replacement of the filter (20) is necessary.

The above dielectric working fluid processor (14) may further include a usability decider (39) configured to determine whether or not the filter (20) is usable for the next machining, based on the obtained feed pressure. Thus, it is possible to determine whether or not the filter (20) can be used for the next machining, without relying on operator's knowledge and experience.

The above dielectric working fluid processor (14) may further include a notifier (30) configured to notify the operator whether or not the filter (20) is usable for the next machining. Thus, it is possible to notify the operator whether or not the filter (20) can be used in the next machining.

The above dielectric working fluid processor (14) may further include a usable time calculator (40) configured to calculate the usable time of the filter (20), based on the obtained feed pressure. Thereby, it is possible to obtain the usable time of the filter (20), without relying on operator's knowledge and experience.

The above dielectric working fluid processor (14) may further include a notifier (30) configured to notify the operator of the calculated usable time of the filter (20). Thus, it is possible to inform the operator of the usable time of the filter (20).

A control method of a dielectric working fluid processor (14) for processing dielectric working fluid is used in a wire electrical discharge machine (10) which includes: a dirty liquid tank (16) configured to store dielectric working fluid containing machining swarf; a filter (20) configured to remove the machining swarf from the dielectric working fluid in the dirty liquid tank (16); a clean liquid tank (22) configured to store the dielectric working fluid from which the machining swarf has been removed by the filter (20); a pump (18) configured to supply the dielectric working fluid from the dirty liquid tank (16) to the filter (20); an inverter (24) configured to control electric power to be supplied to the pump (18); a liquid level obtainer (23) configured to obtain the liquid level of the dielectric working fluid in the clean liquid tank (22); and a pump controller (32) configured to control the rotation speed of the pump (18) by varying the frequency of electric power supplied from the inverter (24)

to the pump (18) so as to adjust the liquid level of the dielectric working fluid in the clean liquid tank (22) to a predetermined liquid level, and the control method comprises a step of obtaining the feed pressure of the dielectric working fluid supplied from the pump (18) to the filter (20), based on the frequency of the electric power. Thereby, it is possible to suppress the cost of manufacturing the dielectric working fluid processor (14).

In the control method of a dielectric working fluid processor (14), the dielectric working fluid processor (14) may further include a storage unit (34) configured to store a predetermined map showing a relationship between the frequency of the electric power and the feed pressure, the relationship given when the liquid level of the dielectric working fluid in the clean liquid tank (22) is within a predetermined range including the predetermined liquid level, and the feed pressure may be obtained based on the map when the liquid level is within the predetermined range. This makes it possible to obtain the pressure of the dielectric working fluid supplied from the pump (18) to the filter (20), in conformity with the degree of clogging of the filter (20).

In the above control method of the dielectric working fluid processor (14) according to claim 10, the dielectric working fluid processor (14) further may include a notifier (30) configured to give notice to the operator, and the control method may further include a step of controlling the notifier (30) so as to notify the obtained feed pressured. Thereby, it is possible to inform the operator of the feed pressure.

The above control method for the dielectric working fluid processor (14) may further include a step of determining that the filter (20) need be replaced when the obtained feed pressure is equal to or higher than a predetermined pressure. Thereby, it is possible to determine the necessity of the replacement of the filter (20), without relying on operator's knowledge and experience.

In the above control method of the dielectric working fluid processor (14), the dielectric working fluid processor (14) may further include a notifier (30) configured to give notice to the operator, and the control method may further include a step of controlling the notifier (30) so as to notify that the filter (20) need be replaced when it is determined so. Thereby, it is possible to inform the operator that the replacement of the filter (20) is necessary.

The above control method for a dielectric working fluid processor (14) may further include a step of determining whether or not the filter (20) is usable for the next machining, based on the obtained feed pressure. Thus, it is possible to determine whether or not the filter (20) can be used for the next machining, without relying on operator's knowledge and experience.

The present invention is not limited to the above-described embodiment, and various modifications can be made without departing from the gist of the present invention.

What is claimed is:

1. A dielectric working fluid processor for processing dielectric working fluid used in a wire electrical discharge machine, comprising:
    a first liquid tank configured to store dielectric working fluid containing machining swarf;
    a filter configured to remove the machining swarf from the dielectric working fluid in the first liquid tank;
    a second liquid tank configured to store the dielectric working fluid from which the machining swarf has been removed by the filter;
    a pump configured to supply the dielectric working fluid from the first liquid tank to the filter;
    an inverter configured to control electric power to be supplied to the pump;
    a liquid level obtainer configured to obtain a liquid level of the dielectric working fluid in the second liquid tank;
    a pump controller configured to control a rotation speed of the pump by varying frequency of the electric power supplied from the inverter to the pump so as to adjust the liquid level of the dielectric working fluid in the second liquid tank to a predetermined liquid level; and
    a control unit configured to determine, using the frequency of the electric power supplied to the pump and without receiving a direct pressure measurement from a pressure sensor, a feed pressure of the dielectric working fluid supplied from the pump to the filter.

2. The dielectric working fluid processor according to claim 1, wherein the control unit comprises a non-transitory storage unit configured to store a predetermined map showing a relationship between the frequency of the electric power and the feed pressure when the liquid level of the dielectric working fluid in the second liquid tank is within a predetermined range including the predetermined liquid level,
    wherein when the liquid level is within the predetermined range, the control unit obtains the feed pressure based on the map.

3. The dielectric working fluid processor according to claim 1, further comprising a notifier configured to notify an operator of the determined feed pressure.

4. The dielectric working fluid processor according to claim 1, wherein the control unit is further configured to determine that the filter need be replaced when the determined feed pressure is equal to or higher than a predetermined pressure.

5. The dielectric working fluid processor according to claim 4, further comprising a notifier configured to notify an operator that the filter need be replaced when it is determined so.

6. The dielectric working fluid processor according to claim 1, wherein the control unit is further configured to determine whether or not the filter is usable for the next machining, based on the determined feed pressure.

7. The dielectric working fluid processor according to claim 6, further comprising a notifier configured to notify an operator of whether or not the filter is usable for the next machining.

8. The dielectric working fluid processor according to claim 1, wherein the control unit is further configured to calculate a usable time of the filter, based on the determined feed pressure.

9. The dielectric working fluid processor according to claim 8, further comprising a notifier configured to notify an operator of the calculated usable time of the filter.

10. A control method of a dielectric working fluid processor for processing dielectric working fluid used in a wire electrical discharge machine, wherein the wire electrical discharge machine includes:
    a first liquid tank configured to store dielectric working fluid containing machining swarf;
    a filter configured to remove the machining swarf from the dielectric working fluid in the first liquid tank;
    a second liquid tank configured to store the dielectric working fluid from which the machining swarf has been removed by the filter;
    a pump configured to supply the dielectric working fluid from the first liquid tank to the filter;
    an inverter configured to control electric power to be supplied to the pump;

a liquid level obtainer configured to obtain a liquid level of the dielectric working fluid in the second liquid tank; and a pump controller configured to control a rotation speed of the pump by varying frequency of the electric power supplied from the inverter to the pump so as to adjust the liquid level of the dielectric working fluid in the second liquid tank to a predetermined liquid level, wherein the control method comprises a step of determining, using the frequency of the electric power supplied to the pump and without receiving a direct pressure measurement from a pressure sensor, a feed pressure of the dielectric working fluid supplied from the pump to the filter.

11. The control method of a dielectric working fluid processor according to claim 10, wherein the dielectric working fluid processor further includes a non-transitory storage unit configured to store a predetermined map showing a relationship between the frequency of the electric power and the feed pressure when the liquid level of the dielectric working fluid in the second liquid tank is within a predetermined range including the predetermined liquid level, and the feed pressure is obtained based on the map when the liquid level is within the predetermined range.

12. The control method of the dielectric working fluid processor according to claim 10, wherein the dielectric working fluid processor further includes a notifier configured to give notice to an operator, the control method further comprising a step of controlling the notifier so as to notify the obtained feed pressure.

13. The control method for the dielectric working fluid processor according to claim 10, further comprising a step of determining that the filter need be replaced when the determined feed pressure is equal to or higher than a predetermined pressure.

14. The control method of the dielectric working fluid processor according to claim 13, wherein the dielectric working fluid processor further includes a notifier configured to give notice to an operator, the control method further comprising a step of controlling the notifier so as to notify that the filter need be replaced when it is determined so.

15. The control method for a dielectric working fluid processor according to claim 10, further comprising a step of determining whether or not the filter is usable for the next machining, based on the determined feed pressure.

* * * * *